United States Patent [19]
Fukushima

[11] Patent Number: 4,629,507
[45] Date of Patent: Dec. 16, 1986

[54] WATER GLASS-BASED INORGANIC MATERIAL AND PROCESS FOR PRODUCING THE SAME

[75] Inventor: Yoshiaki Fukushima, Aichi, Japan

[73] Assignee: Kabushiki Kaisha Toyota Chuo Kenkyusho, Aichi, Japan

[21] Appl. No.: 788,677

[22] Filed: Oct. 17, 1985

Related U.S. Application Data

[63] Continuation of Ser. No. 503,434, Jun. 13, 1983, abandoned.

[30] Foreign Application Priority Data

Jun. 11, 1982 [JP] Japan ................ 57-100891
Jul. 26, 1982 [JP] Japan ................ 57-130141
Jul. 26, 1982 [JP] Japan ................ 57-130142

[51] Int. Cl.$^4$ .................. C09D 1/02; C09J 1/02
[52] U.S. Cl. ................................................ 106/74
[58] Field of Search .................. 106/74, 77, 78, 84; 252/194

[56] References Cited

U.S. PATENT DOCUMENTS

| | | | |
|---|---|---|---|
| 3,755,183 | 8/1973 | Fahn et al. | 252/194 |
| 3,830,892 | 8/1974 | Wada | 264/25 |
| 3,844,804 | 10/1974 | Horai et al. | 106/75 |
| 3,951,673 | 4/1976 | Isohata et al. | 106/84 |
| 3,990,903 | 11/1976 | Mallow | 106/84 |

Primary Examiner—Howard S. Williams
Attorney, Agent, or Firm—Sughrue, Mion, Zinn, Macpeak, and Seas

[57] ABSTRACT

A process for producing a water glass-based material and the inorganic material itself is disclosed. The process involves providing an amount of water glass and causing a solid content of the water glass to react with a coagulant. The reaction is created in one of three possible general ways. Firstly, the water glass and coagulant can be reacted by heating the mixture to a temperature in the range of 80° C. to 600° C. Secondary, the water glass and coagulant can be reacted by providing an alkaline substance in combination with them. Thirdly, the water glass and coagulant can be reacted by providing the coagulant in the form of porous particles which include polyvalent ions capable of coagulating the water glass. All three methods of reacting the coagulant and water glass can include one or more heating steps. The material produced is particularly resistant to heat, water and the combination of heat and water. The material provides a strong adhesive and can be utilized to shape molded objects since it remains in a moldable state for a long period of time after the components are mixed together.

28 Claims, No Drawings

WATER GLASS-BASED INORGANIC MATERIAL AND PROCESS FOR PRODUCING THE SAME

This is a continuation of application Ser. No. 503,434, filed 6/13/83, now abandoned.

FIELD OF THE INVENTION

The present invention relates to a water glass-based inorganic material that can be handled easily and which is provided with high resistances to water, hot water and heat, produced by solidifying water glass in the presence of a coagulant that releases polyvalent ions capable of coagulating the water glass. The present invention also relates to a process for producing the inorganic material.

BACKGROUND OF THE INVENTION

Water glass is a material extensively used in industry. It is a colorless, highly viscous liquid material that is usually available as a thick aqueous solution of an alkali silicate produced by fusing silicon dioxide and an alkali together. Upon standing in the atmosphere, water glass solidifies as a result of water evaporation. Because of this property, water glass is extensively used in the production of artificial stones, ceramics and adhesives for corrugated board.

However, upon contact with water, the solidified water glass absorbs water and returns to a viscous liquid form. Therefore, water glass cannot be incorporated in articles that are used outdoors under humid conditions or in areas where they are put into direct contact with water. Therefore, one great disadvantage of water glass is its low resistance to water. Furthermore, if solidified water glass is heated at a temperature of higher than 150° C., its strength is reduced to such an extent that it is no longer usable in shaped articles or adhesives.

It is known that upon addition of Ca, Mg, Al, Ba or the like, water glass solidifies and becomes water-insoluble or resistant to water. However, if these elements are added in an ionic form, the water glass gels so quickly that it does not permit practical operations such as shaping or coating. It is also known that the solidification of water glass may be accelerated by the addition of a hydrous magnesium silicate mineral such as sepiolite. However, the water glass composition solidified by this method does not provide satisfactory hot water-resistance.

SUMMARY OF THE INVENTION

Therefore, the primary object of the present invention is to provide a water glass-based inorganic material having good handling properties, and high resistances to water, hot water and heat, as well as a process for producing the inorganic material.

As a result of various studies made to eliminate the above-described defects of the conventional water glass composition, we have found that the above object can be achieved by a process which consists essentially of first mixing water glass with a coagulant which releases polyvalent ions capable of coagulating the water glass and then solidifying the resulting mixture wherein a solid content of the water glass and the polyvalent ions are thoroughly reacted by:

(i) adding to the water glass a coagulant comprised of porous particles capable of releasing polyvalent ions capable of coagulating the water glass;

(ii) adding to the water glass a coagulant capable of releasing polyvalent ions capable of coagulating the water glass and an alkaline substance represented by MOH, wherein M is selected from the group consisting of alkaline metals and alkaline bases; and/or (iii) adding to the water glass a coagulant capable of releasing polyvalent ions capable of coagulating the water glass and heating the water glass and coagulant to a temperature in the range of 80° C. to 600° C.

DETAILED DESCRIPTION OF THE INVENTION

The water glass used in the present invention is usually available as a 10 to 70 wt% aqueous solution of an alkali silicate, which is generally represented by $M'_2O.nSiO_2$ [wherein $M'$ is an alkali metal such as K, Na, or Li, or a base such as $NH_4$; n is from 1 to 4]. This alkali silicate is hereunder referred to as the solid content of water glass. Of these, $Na_2O.nSiO_2$ is preferably used as it is not expensive and provides an inorganic material having an excellent adhesiveness in the present invention. In particular, n is preferably from 2.1 to 3.5, more preferably about 3, since the resulting inorganic material of the present invention shows excellent water-resistance. The solid content of water glass varies depending on end use of the inorganic material of the present invention. When the inorganic material is applied on a substance with a brush or spatula before solidification, water glass having a relatively low solid content (e.g., about 10 wt%) is generally used. When the inorganic material is used as a joint compound or an adhesive, water glass having the solid content of more than 50 wt% may be used. Commercial products of water glass are also available and those designated as water glass No. 1 to No. 3 under JIS (The Japanese Industrial Standards) may be used, with water glass No. 3 ($Na_2O.nSiO_2$, n: 2-4, and solid content: about 40%) being preferred. There is no single particular value for the pH of the water glass but it is usually about 12.

Any material can be used as the coagulant to be mixed with the glass water so long as it releases polyvalent ions (e.g., Mg, Al, Ca and Ba) for coagulating the water glass. The coagulant may consist of a hydrous magnesium silicate mineral that releases polyvalent ions through exchange with ions of an alkali such as Na, or it may be porous particles having polyvalent ions impregnated therein or adsorbed thereto (hereafter referred to as "impregnated coagulant"). The coagulant of the first type releases polyvalent ions indirectly through exchange with alkali ions contained in the water glass, whereas the coagulant of the second type, i.e., impregnated coagulant, releases polyvalent ions directly as a result of simple mixing with the water glass, thus enabling the released polyvalent ions to be thoroughly reacted with the solid content of the water glass. Furthermore, the impregnated coagulant has slow release action, namely, it gradually releases the polyvalent ions into the reaction system, so that water glass mixed with this coagulant does not solidify too quickly. Therefore, the resulting water glass composition does not solidify for a relatively long time, making it very easy to handle.

Illustrative porous particles for use in preparation of the impregnated coagulant include particles of fibrous materials such as sepiolite (also known as mountain cork, mountain leather or mountain wood), attapulgite and palygorskite; laminar materials such as montmorillonite, kaolinite, vermiculite and graphite; and porous materials such as zeolite and cristobalite. The particles of hollow glass having very fine pores are also usable.

The sepiolite is a mineral mainly composed of hydrous magnesium silicate, and the attapulgite and palygorskite are minerals each composed of hydrous magnesium aluminum silicate. Each of these minerals is an assembly of long fibers having a parallelogrammatic cross section about 0.1 μm per side, with many holes present in that assembly in the longitudinal direction of the fibers. The respective fibers have highly reactive hydroxyl groups on their surface, so they are capable of adsorbing or absorbing a large volume of water.

The laminar materials such as vermiculite comprise thin layers mainly composed of aluminum silicate, etc.

Cristobal stone which is a porous cristobalite particle produced in Aomori, Japan, and zeolite are porous particulate materials mainly composed of silicates. Cristobal stone, in particular, is characterized by the presence of many pores leading to the surface of individual particles, with the pore size being about 70 Å and the porosity being about 50%.

The above-described fibrous, laminar or porous materials are ground with a mill or any suitable device to form porous particles having a particle size ranging from 20 to 500 μm.

The porous particles are brought into contact with the polyvalent ions mentioned above by, for example, immersing them in a solution of a salt containing at least one of the polyvalent ions. Preferred salts are water-soluble and include $Mg(NO_3)_2$, $AlCl_3$, $CaCl_2$, $CaCO_3$, $CaSO_4$ and $BaCl_2$. Salts having a low water-solubility such as $CaCO_3$ and $CaSO_4$ are preferably used to impregnate in the porous particles. When the porous particles are coated with a water-soluble material as described later, salts having a high water-solubility may be used. Further, when adsorbed on porous particles of clayey minerals such as sepiolite, montomorillonite and vermiculite, highly water-soluble salts such as $CaCl_2$ and $AlCl_3$ are preferably used. These salts may be used either alone or in mixture. Preferred solvents for making solutions of these salts are water, alcohol and other volatile organic solvents. The preferred concentration of the salts is in the vicinity of the saturated solid solubility which is determined by the type of the salt and solvent used. However, lower concentrations may well be used. The salts may be in a molten or gaseous state when brought into contact with the porous particles. By either of the methods described above, the polyvalent ions are adsorbed on the porous particles either physically or through ion exchange, or the ions are entrapped in the pores open to the surface of the porous particles. As a result, the polyvalent ions are firmly bonded to the porous particles. Then, excess solution merely depositing on the surface of the porous particles is removed by suitable means such as washing with water, whereupon the impregnated coagulants are prepared and can be used as the coagulant according to the present invention.

As described above, the impregnated coagulants are capable of releasing such ions gradually, so that when they are mixed with water glass, the resulting composition does not solidify quickly and in easy to handle. In general, the reaction does not proceed several ten minutes to one hour after mixing and the reaction is completed by drying the mixture for several hours to several days. The amount of time before the composition solidifies can be controlled by changing the type and amount of the polyvalent ions and porous particles. It is particularly preferred that the surface of the impregnated coagulant is provided with a coating of water-soluble material because it makes it possible to more easily control the amount of time which the mixture of water glass and coagulant permits practical operations such as shaping or coating. Preferred water-soluble materials include organic compounds such as polyvinyl alcohol, starch and dextrin, and inorganic compounds such as $NaNO_3$, $Ca(OH)_2$, $NaCl$, $Ba(OH)_2$ and $Al(OH)_3$. The coating of water-soluble material can be formed on the impregnated coagulant by immersing the coagulant in an aqueous solution of water-soluble material or to spray the coagulant with the solution, followed by drying. By either method, an impregnated coagulant having a coating of water-soluble material on the surface can be prepared.

The advantage of the coated coagulant is that the release of polyvalent ions into the water glass is held to a minimum until the coating dissolves with water contained in the water glass, thus extending the time which the water glass composition permits practical operations by 2 to 10 times that using the impregnated coagulant without a coating of water-soluble material. The time can be controlled by changing the type of polyvalent ions, porous particles and the water-soluble material, as well as the thickness of the coating. The thickness of the coating varies depending on the mixing condition of the coagulant and water glass and the solidifying condition of the mixture such as a solidifying temperature, but the thickness of the coating is preferably thin so as to attain a satisfactory water-resistance of the inorganic material of the present invention. In order to defer the reaction between the impregnated coagulant and water glass for several ten minutes to 1 hour, low water-soluble materials such as $Ca(OH)_2$ are coated in a thickness of about 0.1 to 1.0 μm, highly water-soluble materials such as $NaNO_3$ are coated in a thickness of about 10 μm to 0.1 mm, or water-soluble high molecular materials such as polyvinyl alcohol and dextrin are coated in a thickness of about 1.0 to 10 μm. When attempting to control the time which the composition permits practical operations, a mixture of impregnated coagulants having water-soluble coatings of different types and thicknesses is more effectively used than an impregnated coagulant having a single type of coating with respect to preventing strains or cracks from occurring during the subsequent solidification step.

The preferred proportion of the impregnated coagulant coated or uncoated with the water-soluble material ranges from 0.1 to 95 wt%, more preferably from 40 to 90 wt%, of the solid content of water glass on a dry basis (dried at about 80° C. for 10 hours). It is most preferred that the amount of the polyvalent ions impregnated in or adsorbed on the porous particles is equal to the amount of alkali metal ions present in the water glass.

The other type of coagulant, the hydrous magnesium silicate mineral that releases polyvalent ions through exchange with alkali ions, is comprised of fine particles of an ore such as hydrous magnesium silicate or hydrous silicate of magnesium and aluminum. Specific examples are sepiolite, attapulgite and palygorskite. These hydrous magnesium silicate minerals release polyvalent ions such as Mg ion and Al ion upon destruction of their crystalline structure due to alkali ions such as Na ion contained in the water glass, and the alkali ions are fixed either around or within the minerals, whereby the water glass is solidified. The preferred proportion of this mineral ranges from 0.1 to 95 wt%, more preferably from 40 to 90 wt%, of the solid content of water glass on a dry basis. Within the above range, high resistance to water is obtained by the subsequent solidification step, and, in addition, the mixture does not shrink during solidification so that it is free from cracking. Further, the product obtained by solidification has adequate strength, and what is more, it provides the satisfactory adhesion to a substrate to which it is applied. Therefore, it can be satisfactorily used in an adhesive or paint.

The coagulants that release polyvalent ions directly or through ion exchange according to the present invention may be used either alone or in combination.

In the first embodiment of the present invention wherein porous particles having polyvalent ions impregnated therein or adsorbed thereon, i.e., impregnated coagulants, with or without the water-soluble coating are used as a coagulant, the polyvalent ions are directly released from the impregnated coagulant and the reaction proceeds thoroughly between the polyvalent ions and the solid content of water glass. Therefore, by merely mixing the impregnated coagulant with the water glass and solidifying the mixture, an inorganic material having high resistance to water, hot water and heat can be produced. The mixing operation may be manual or mechanical, and a suitable amount of water may be added to facilitate the operation.

The resulting mixture of the water glass and the impregnated coagulant is subsequently solidified after an optional shaping step. The mixture may be shaped into a desired form with or without a mold, or by applying it onto a substrate with a brush or spatula. When a mold is used, the mixture may have a relatively low viscosity, but if no mold is used, the viscosity of the mixture is desirably high enough to prevent its deformation under its own weight. If a brush or spatula is used, the mixture desirably has a relatively low viscosity.

The mixture can be solidified by air drying at around room temperature. Alternatively, as in the third embodiment of the present invention which will be described later, heat may be applied to the mixture to solidify it. The advantage of solidifying the mixture with heat is that the resulting product has even higher resistances to water and heat. According to the first embodiment, the polyvalent ions that coagulate the water glass are slowly released from the porous particles. Therefore, the mixture has a longer time which allows practical operations, and the ease with which it can be handled during the shaping step is increased. As a further advantage, the mixture has a suitable degree of viscosity and exhibits a great initial bonding strength. The inorganic material thus produced by the present invention does not dissolve when it is rubbed after being sprinkled with water. Even if it is left in hot water (60° C.) for a prolonged period, it does not dissolve or swell. Further, it does not foam when heated to 600° C.

An inorganic material of good characteristics can be also produced by adding an alkaline substance to the reaction system including water glass and the hydrous magnesium silicate mineral or the hydrous magnesium aluminum silicate mineral as a coagulant (the second embodiment) and/or by heating the reaction system (the third embodiment) because the polyvalent ions released from the coagulant through ion exchange are thoroughly reacted with the solid content of water glass.

According to the second embodiment, water glass, the hydrous magnesium silicate mineral or the hydrous magnesium aluminum silicate mineral and an alkaline substance are mixed, and the mixture is solidified after an optional shaping step. The alkaline substance is represented by the chemical formula MOH, wherein M is an alkali metal such as K or Na, or a base such as ammonia. Preferred alkaline substances are potassium hydroxide and sodium hydroxide which exhibit a high degree of alkalinity when they are dissolved in water. The mineral may be added to the water glass prior to addition of the alkali substances, or the alkaline substance may be added first, or both may be added to the water glass simultaneously.

The amount of alkaline substance varies depending on the type of water glass, hydrous magnesium silicate mineral or the hydrous magnesium aluminum silicate mineral and the temperature of the reaction system. For example, NaOH is preferably added in an amount of about 5 g in 100 g of water glass No. 3. When sepiolite is used as the mineral, the alkali substances are preferably added in such an amount that pH of the resulting reaction system reaches about 13 since sepiolite is dissolved at pH of 12.5 or higher.

In the second embodiment of the present invention, the mineral in the mixture dissolves upon addition of the alkaline substance and releases magnesium and/or aluminum ions which react with the water glass to form a water-insoluble substance. The inorganic material thus produced has high resistance to water and heat as compared to that obtained in the absence of the alkaline substance.

A particularly valuable improvement with respect to resistances to water and heat, as well as to hot water can be realized by solidifying the mixture of the water glass, hydrous magnesium silicate mineral and alkaline substance after adjusting its pH to 12.5 or higher, more preferably about 13. Procedures of this embodiment may be carried out as follows. First, the alkaline substance is added to water glass. This is achieved by gradually adding a thick aqueous solution of the alkaline substance until the pH of the mixture becomes 12.5 or higher. Thereafter, fine particles of the mineral are added and the mixture is thoroughly kneaded. A plausible explanation of the effect of controlling the pH of the mixture at 12.5 or higher is that the mineral in the mixture is gradually dissolved to release a suitable amount of magnesium and/or aluminum ions to achieve thorough reaction with the solid content of water glass. If the pH of the mixture is less than 12.5, the effect of adding the alkaline substance is not fully exhibited because the mineral is not completely reacted with the solid content of water glass (e.g., $Na_2O.nSiO_2$) to provide a solidified product enjoying the advantage of the addition of the alkaline substance. The mixture containing the alkaline substance at a pH of 12.5 or higher does not gel as quickly as the water glass to which magnesium chloride has been added. The mixture does not solidify completely and can be shaped, for at least one month and can be handled easily during the subsequent operation.

According to the second embodiment, the alkaline substance aids in complete reaction between the polyvalent ions and the solid content of water glass, and the mixture solidifies satisfactorily without heating. But by heating the mixture as in the third embodiment, which is described below the effectiveness of the alkaline substance is increased and a product having a greater resistance to hot water can be obtained.

In the third embodiment of the present invention, water glass is mixed with the hydrous magnesium silicate mineral or the hydrous magnesium aluminum silicate mineral, and after optional shaping, the mixture is heated at a temperature between 80° and 600° C. for solidification. The product obtained by solidification in an atmosphere having a temperature of 75° C. or lower has some degree of water resistance, but if it is immersed in warm water (about 30° C.) for 48 hours or more, it starts to dissolve slightly from the surface. But the product obtained by solidifying the mixture at a temperature of between 80° and 600° C. hardly dissolves in hot water of 40° C. or higher. Heating the mixture at a temperature between 110° and 160° C. is preferred since a homogeneous solidified product having no defect such as blisters is obtained without causing a sudden change in the structure of the mixture.

It is particularly preferred to heat the mixture at a temperature of 80° to 95° C. followed by further heating at a temperature of 110° to 200° C. because the solidified product has an increased resistance to hot water so that it can be immersed in hotter water for a prolonged period without causing dissolution of the surface. The first heating step at a temperature of 80° to 95° C. is performed until water contained in the water glass (but not water content of the mineral) is substantially removed from the mixture to begin solidification. In general, it takes about 1 to 50 hours therefor. In the case, a completely solidified product will experience no change at all even if it is heated at 600° C.

A plausible explanation for the mechanism by which an inorganic material having particularly improved resistances to hot water and heat is obtained by solidifying the water glass mixture with heat is as follows. At temperatures lower than 100° C., almost all water present in the water glass is evaporated, but the evaporation of the water attached to the surface of the mineral or present in its interior is negligible until at 100° to 110° C. Therefore, by heating the mixture at a temperature not higher than 100° C., the water in the glass is evaporated but water still remains around the mineral. Alkali ions contained in the water glass such as Na ion having high water solubility are concentrated around the mineral and the chance of exchange for polyvalent ions such as Mg ion and Al ion in the mineral is increased. This initiates a thorough reaction between the polyvalent ions and solid content of water glass, producing a large amount of a substance that is insoluble in water either cool or hot. Thus, the heated water glass mixture contains less of the alkaline component that has high affinity for water, so that it has increased water resistance. If the mixture is further heated at a temperature higher than 110° C., the water around the mineral also evaporates, and the alkali ions concentrated around the mineral are fixed either around or within the mineral. This inhibits the diffusion of these ions into the water glass, leading to an even higher resistance to hot water.

In the second and third embodiments of the present invention, the hydrous magnesium silicate mineral is used as a coagulant for achieving the thorough reaction between the solid content of water glass and polyvalent ions. However, as will be understood from the foregoing description, the impregnated coagulant where the porous particles are made of a hydrous magnesium silicate mineral, i.e., sepiolite or the hydrous magnesium aluminum silicate mineral, i.e., attapulgite or palygorskite can also be advantageously used in the second and third embodiments.

In the mixing step, a suitable amount of a filler that has no adverse effects on the properties of water glass may be added. Illustrative fillers are inorganic materials such as silica sand, glass powder, glass fibers, mica, bentonite, talc and asbestos, as well as organic materials such as rubber latex and cellulose fibers. The advantage of adding these materials is that the shrinkage of the water glass upon solidification is reduced.

As will be apparent from the foregoing description, the inorganic material of the present invention has good handling properties, as well as high resistances to water, hot water and heat, so it can be extensively used as a material for shaped articles or adhesives in many fields such as building construction, civil engineering, chemistry and ceramics.

The present invention is hereunder described in greater detail by reference to the following working example, to which the scope of the present invention is by no means limited.

EXAMPLE 1

A hundred grams of Spanish sepiolite powder was added to 1,000 ml of water. The mixture was stirred in a mixer having steel blades. To the mixture, 10 g of calcium chloride ($CaCl_2.6H_2O$) was added, and thorough agitation was effected to dissolve calcium chloride, which was left to stand for 30 minutes. The mixture was filtered with a Buchner funnel and a suction bottle. The residue on the funnel was suspended in 1,000 ml of water for washing. After washing the residue five times in this manner, it was dried at 80° C. for 48 hours and ground with an alumina ball mill for 10 hours to prepare sepiolite particles having calcium ions impregnated therein or adsorbed thereon.

Forty grams of the thus prepared coagulant was thoroughly mixed with 200 g of water glass No. 3 to prepare a water glass mixture according to the present invention. The mixture was coated on a square aluminum plate (10 cm per side, and 2 mm thick) with a spatula and dried at 80° C. for 10 hours to provide a coating having a thickness of about 0.5 mm. During the drying and solidification step, the coating did not shrink at all. It also had good adhesion to the aluminum substrate without any cracking or exfoliation. The coating was immersed in hot water (60° C.) for 72 hours but its surface did not dissolve in water at all. The same coating was heated at 300° C. for 30 minutes. It had high heat resistance and showed no change in appearance.

The mixture was also coated on a square aluminum plate of the same size as described above and left to stand at room temperature. It took 24 full hours for the mixture to solidify, and the solidified coating neither cracked nor separated from the aluminum plate. The same coating was immersed in water for a week, but it did not dissolve in water.

It was confirmed that when the water glass mixture prepared according to the present invention was solidified in a hot atmosphere, a product having particularly high resistances to hot water and heat was obtained.

EXAMPLE 2

A hundred grams of porous cristobalite powder from Aomori Prefecture, Japan (100 mesh pass) was mixed with 10 g of magnesium nitrate [$Mg(NO_3)_2.3H_2O$]. The mixture was heated in a crucible at 150° C. for 20 minutes until the magnesium nitrate was impregnated in fine pores in the cristobalite particles. After cooling, the particles were slightly crushed in a mortar and immersed in a 10 wt% aqueous solution of polyvinyl alcohol (average molecular weight: about 500). Immediately thereafter, the solution was filtered with a Buchner funnel and a suction bottle. The residue on the funnel was dried at 80° C. for 10 hours and slightly crushed to prepare cristobalite particles that had magnesium nitrate impregnated therein and which had a polyvinyl alcohol coating.

Ten grams of this coagulant was mixed with 200 g of water glass No. 3 of the same type as used in Example 1. The mixture was coated on one surface of each of two foamed glass sheets (100×50×15 mm), and the coated surfaces were pressed against each other. When the water glass mixture was coated on the foamed glass sheets, it did not even start to solidify. It was viscous, as is typical of water glass, and exhibited an adequate initial bond strength. The so assembled sheets were left to stand at room temperature for 72 hours to dry and solidify the mixture until the two sheets were firmly bonded together.

The bonded section of the glass sheets was held under flushing water for 7 days or exposed to a temperature of 250° C. for 30 minutes. The adhesive coating between the two sheets retained a bonding strength of 3 kg/cm$^2$ or more. It was therefore confirmed that an adhesive having high resistances to water and heat could be provided by solidifying the water glass mixture according to the present invention.

EXAMPLE 3

A hundred grams of U.S. attapulgite powder was suspended in 1,000 ml of water. To the resulting suspension, a solution of 10 g of calcium chloride (CaCl$_2$.7H$_2$O) in 100 ml of water was added, and the mixture was left to stand at 20° C. for 2 hours. The mixture was filtered, washed and dried at 100° C. for 24 hours.

A hundred parts by weight (as solid) of water glass containing 20 wt% of K$_2$O.SiO$_2$ as an alkali silicate was mixed with 15 parts by weight of the attapulgite powder having calcium ions adsorbed thereon, 10 parts by weight of TiO$_2$ powder (60 to 150 mesh) and 10 parts by weight of flaky African vermiculite particles. The African vermiculite powder was prepared by thermally expanding the mineral, grinding it with a mixer having steel blades and passing the particles through a 60-150 mesh screen.

The resulting paint composition was coated on a 10 mm-thick plywood with a brush, and the coating was dried at 20° C. for 10 hours, then at 80° C. for 1 hour. No crack developed in the coating throughout this solidification step. The resulting coating was placed under flushing water for 5 days and no change occurred in the coating.

EXAMPLE 4

A hundred ml of a 50 wt% aqueous solution of potassium hydroxide was added to 1,000 ml of water glass No. 3 under thorough stirring to make a mixture having a pH of 13. To the mixture, 5 parts by weight of Spanish sepiolite powder was added on the basis of 100 parts by weight of the solid content of the water glass, and thoroughly agitated to provide a water glass mixture.

The mixture was coated on one end of each of two aluminum rods (5×20 mm in cross section and 50 mm long). The coated ends were pressed against each other and left to stand until the mixture solidified, thereby firmly bonding the two aluminum rods together. A number of test samples were prepared by bonding two aluminum rods together with the water glass mixture of the present invention and they were subjected to a measurement of bonding strength. In preparing the test samples, solidification was effected either at room temperature or by heating at four different temperatures for the purpose of checking the relation between the conditions for solidification and the bonding strength. The solidification conditions used for preparing each sample are shown in Table 1. Sample No. 1 was prepared by solidifying at 20° C. for 72 hours; Sample No. 2 was held at 120° C. for 24 hours; Sample No. 3 was held at 300° C. for 24 hours; and Sample No. 4 was first held at 90° C. for 24 hours, then at 150° C. for 5 hours. Reference Sample No. R-1 was prepared from two aluminum rods bonded together with a mixture of only water glass No. 3 and Spanish sepiolite powder, which was solidified by heating at 80° C. for 24 hours.

Each sample group was divided into three subgroups consisting of 10 specimens which were subjected to a tensile test; the specimens of one subgroup were tested immediately after the completion of solidification, those of the second subgroup were tested after holding them in hot water (40° C.) for 10 days, and those of the third subgroup were tested after holding them at 450° C. for 2 hours. The results are shown in Table 1, with the values being the average strength of 10 specimens for each subgroup.

TABLE 1

| Sample No. | Heating Conditions Temperature (°C.) × Time (hr) | Bonding Strength (kg/cm$^2$) | | |
|---|---|---|---|---|
| | | As Bonded | Held in Warm Water (40° C.) for 10 Days | Held at 450° C. for 2 Hours |
| 1 | 20 × 72 | 7.2 | 6.1 | 5.2 |
| 2 | 120 × 24 | 5.8 | 5.4 | 5.3 |
| 3 | 300 × 24 | 4.2 | 4.1 | 4.4 |
| 4 | 90 × 24, followed by 150 × 5 | 5.2 | 5.5 | 5.6 |
| R-1 | 80 × 24 | 7.0 | 2.3 | 4.1 |

The results show that the samples of inorganic material prepared with the addition of alkaline substance did not deteriorate or their bonding strengths were not reduced even when they were immersed in hot water or exposed to hot air, and they had higher resistances to hot water and heat than the reference sample.

EXAMPLE 5

The procedure of Example 4 was repeated except that 500 parts of sepiolite powder was used for 100 parts by weight of the solid content of water glass. The solidification conditions and the average bonding strength of each subgroup are shown in Table 2. Referance Sample No. R-2 was prepared from two aluminum rods bonded together with a mixture of only water glass No. 3 and Spanish sepiolite powder.

TABLE 2

| Sample No. | Heating Conditions Temperature (°C.) × Time (hr) | Bonding Strength (kg/cm$^2$) | | |
|---|---|---|---|---|
| | | As Bonded | Held in Warm Water (40° C.) for 10 Days | Held at 450° C. for 2 Hours |
| 5 | 20 × 72 | 6.3 | 5.2 | 4.9 |
| 6 | 120 × 24 | 4.2 | 4.1 | 4.7 |
| 7 | 300 × 24 | 4.4 | 4.3 | 4.8 |
| 8 | 90 × 24, followed by 150 × 5 | 4.4 | 4.5 | 4.6 |

TABLE 2-continued

| Sample No. | Heating Conditions Temperature (°C.) × Time (hr) | Bonding Strength (kg/cm$^2$) | | |
|---|---|---|---|---|
| | | As Bonded | Held in Warm Water (40° C.) for 10 Days | Held at 450° C. for 2 Hours |
| R-2 | 80 × 24 | 6.1 | 2.5 | 3.5 |

The results show that the samples of inorganic material prepared with the addition of alkaline substance had a greater resistance to hot water and heat than the reference sample.

EXAMPLE 6

A hundred parts by weight (as solid) of water glass containing 20 wt% of $Na_2O.2SiO_2$ as an alkali silicate was mixed with 10 parts by weight of Spanish sepiolite powder (average particle size: about 10 μm) and 20 parts by weight of sodalime glass powder. The mixture was put in a 1,000 ml beaker and was stirred well with a glass rod to prepare a water glass mixture.

Samples of the mixture were poured into iron molds (inside dimensions: 10×10×50 mm) lined with silicone oil as a releasing agent. The molds were heated under the conditions shown in Table 3, to obtain Sample Nos. 9 to 14 and Comparative Sample No. C-1. The samples of each sample group consisting of three specimens were immersed in water at different temperatures (20° C., 40° C. and 60° C.) for 10 days. The results are shown in Table 3.

TABLE 3

| Sample No. | Heating Conditions Temperature (°C.) × Time (hr) | Resistance to Hot Water* | | |
|---|---|---|---|---|
| | | 20° C. | 40° C. | 60° C. |
| 9 | 85 × 48 | A | B | C |
| 10 | 110 × 24 | A | A | C |
| 11 | 150 × 10 | A | A | A |
| 12 | 350 × 5 | A | A | A |
| 13 | 85 × 24, followed by 120 × 3 | A | A | A |
| 14 | 85 × 24, followed by 180 × 2 | A | A | A |
| C-1 | 60 × 72 | A | C | C |

*A: The surface of the sample did not dissolve.
B: Part of the surface was slimy.
C: The surface was slimy throughout.

The results show that inorganic materials prepared by heating at 80° C. or more had high resistance to hot water.

EXAMPLE 7

A water glass mixture of the same composition as prepared in Example 6 was coated on one end of 6 rectangular foamed glass bars (measuring 20×40×100 mm, with a bulk specific gravity of 0.2). The coated end of one bar was pressed onto the coated end of another bar. In this way, three pairs of bonded glass bars were prepared. They were dried in an electric oven at 120° C. for 24 hours to thereby prepare three test pieces each having a joint made of the inorganic material of the present invention.

One test piece was subjected to a tensile test. The joint had a tensile strength of 3 kg/cm$^2$, and the test piece did not break at the joint; the foamed glass bar itself broke. Another test piece was put under flushing water for 10 days and thereafter it was subjected to a tensile test. The joint had a tensile strength of 3.2 kg/cm$^2$. As in the first test piece, the foamed glass itself broke. The last test piece was reheated at 350° C. for 1 hour, later cooled and immersed in hot water (60° C.) for 10 days. In the subsequent tensile test, the sample was found to have a tensile strength of 3.1 kg/cm$^2$. Again, the foamed glass bar itself broke.

These results show that the inorganic materials of the present invention were capable of providing adhesives having high resistances to water, hot water and heat.

EXAMPLE 8

Water glass of the same type as used in Example 6 was mixed with 50 parts by weight of Spanish sepiolite powder on the basis of 100 parts by weight of the solid content of the water glass. The resulting water glass mixture of the present invention was deposited on the surface of six pure aluminum strips (60 mm long, 20 mm wide and 3 mm thick) and the coated surface of one strip was pressed against the coated surface of another, so as to prepare three pairs of bonded Al strips. The coverage of the mixture on each surface was 20 mm×20 mm.

The bonded Al strips were heated at 150° C. for 24 hours to prepare three test pieces using the inorganic material of the present invention. The first piece was subjected to a tensile shear test after placing it under flushing water (20° C.) for 10 days. The second one was subjected to the tensile shear test after immersion in hot water (40° C.) for 10 days. The third piece was immediately subjected to the test. The test pieces had tensile shear strengths of 5.4 kg/cm$^2$, 5.3 kg/cm$^2$ and 5.7 kg/cm$^2$, respectively.

Two comparative test pieces were prepared by repeating the above procedure except that aluminum strips coated with the water glass mixture were solidified by leaving them at room temperature for 1 week. They were subjected to a tensile test after they were immersed in hot water (40° C.) for 10 days. The average tensile strength of the two comparative samples was 2.4 kg/cm$^2$ which was less than a half of the values obtained with the present invention. These results show that the present invention is capable of providing a solidified water glass composition having a greater adhesion strength and a higher resistance to hot water.

While the invention has been described in detail and with reference to specific embodiments thereof, it will be apparent to one skilled in the art that various changes and modifications can be made therein without departing from the spirit and scope thereof.

What is claimed is:

1. An inorganic material produced by preparing a coagulant by allowing porous particles of sepiolite to be impregnated with or to adsorb polyvalent ions capable of coagulating water glass; and
   adding the coagulant to water glass;
   thereby allowing the polyvalent ions to gradually release from the coagulant and thus allowing the polyvalent ions and a solid content of the water glass to thoroughly react;
   wherein said polyvalent ions are selected from the group consisting of Mg, Al, Ca and Ba ions.

2. An inorganic material according to claim 1 produced by further comprising the step of:
   heating the water glass and coagulant to a temperature in the range of 80° C. to 600° C.,
   thereby allowing the polyvalent ions to gradually release from the coagulant in an increased amount and thus allowing the polyvalent ions and a solid content of the water glass to thoroughly react.

3. An inorganic material produced by:
adding a coagulant composed of sepiolite to water glass; and
heating the water glass and coagulant to a temperature in the range of 80° C. to 600° C.;
thereby allowing polyvalent ions in the coagulant to gradually release from the coagulant and thus allowing the polyvalent ions and a solid content of the water glass to thoroughly react.

4. A process for producing an inorganic material, comprising the steps of:
preparing a coagulant by allowing sepiolite to be impregnated with or to adsorb polyvalent ions capable of coagulating water glass; and
adding the coagulant to water glass;
thereby allowing the polyvalent ions to gradually release from the coagulant and thus allowing the polyvalent ions and a solid content of the water glass to thoroughly react;
wherein the polyvalent ions are selected from the group consisting of Mg, Al, Ca and Ba ions.

5. A process for producing an inorganic material as claimed in claim 4, further comprising:
after combining the coagulant and water glass, heating the coagulant and water glass to a temperature in the range of 80° C. to 600° C.

6. A process for producing an inorganic material as claimed in claim 5, wherein said heating is carried out at a temperature within the range of 110° C. to 160° C.

7. A process for producing an inorganic material as claimed in claim 5, wherein said heating is carried out in a first step at a temperature of 80° C. to 95° C. followed by a second step at a temperature of 110° C. to 200° C.

8. A process for producing an inorganic material as claimed in claim 4, wherein the coagulant is produced by contacting the sepiolite with a compound selected from the group consisting of $Mg(NO_3)_2$, $AlCl_3$, $CaCl_2$, $CaCO_3$, $CaSO_4$ and $BaCl_2$.

9. A process for producing an inorganic material as claimed in claim 4, wherein the coagulant has a water-soluble material coated thereon.

10. A process for producing an inorganic material as claimed in claim 9, wherein the coagulant has a plurality of different coatings thereon wherein each coating has a different degree of water-solubility.

11. A process for producing an inorganic material as claimed in claim 9, wherein the water-soluble coating is comprised of material selected from the group consisting of polyvinyl alcohol, starch, dextrin, $NaNO_3$, $Ca(OH)_2$, $NaCl$, $Ba(OH)_2$ and $Al(OH)_3$.

12. A process for producing an inorganic material comprising the steps of:
adding a coagulant composed of sepiolite to water glass; and
heating the water glass and coagulant to a temperature in the range of 80° C. to 600° C.;
thereby allowing polyvalent ions in the coagulant to gradually release from the coagulant and thus allowing the polyvalent ions and a solid content of the water glass to thoroughly react.

13. A process for producing an inorganic material as claimed in claim 12, wherein said heating is carried out at a temperature within the range of 100° C. to 160° C.

14. A process for producing an inorganic material as claimed in claim 12, wherein said heating is carried out in a first step at a temperature of 80° C. to 95° C. followed by a second step at a temperature of 110° C. to 200° C.

15. An inorganic material produced by preparing a coagulant by allowing porous particles of palygorskite to be impregnated with or to adsorb polyvalent ions capable of coagulating water glass; and
adding the coagulant to water glass;
thereby allowing the polyvalent ions to gradually release from the coagulant and thus allowing the polyvalent ions and a solid content of the water glass to thoroughly react;
wherein said polyvalent ions are selected from the group consisting of Mg, Al, Ca and Ba ions.

16. An inorganic material according to claim 15 produced by further comprising the step of:
heating the water glass and coagulant to a temperature in the range of 80° C. to 600° C.,
thereby allowing the polyvalent ions to gradually release from the coagulant in an increased amount and thus allowing the polyvalent ions and a solid content of the water glass to thoroughly react.

17. An inorganic material produced by:
adding a coagulant composed of palygorskite to water glass; and
heating the water glass and coagulant to a temperature in the range of 80° C. to 600° C.;
thereby allowing polyvalent ions in the coagulant to gradually release from the coagulant and thus allowing the polyvalent ions and a solid content of the water glass to thoroughly react.

18. A process for producing an inorganic material, comprising the steps of:
preparing a coagulant by allowing palygorskite to be impregnated with or to adsorb polyvalent ions capable of coagulating water glass; and
adding the coagulant to water glass;
thereby allowing the polyvalent ions to gradually release from the coagulant and thus allowing the polyvalent ions and a solid content of the water glass to thoroughly react;
wherein the polyvalent ions are selected from the group consisting of Mg, Al, Ca and Ba ions.

19. A process for producing an inorganic material as claimed in claim 18, further comprising:
after combining the coagulant and water glass, heating the coagulant and water glass to a temperature in the range of 80° C. to 600° C.

20. A process for producing an inorganic material as claimed in claim 19, wherein said heating is carried out at a temperature within the range of 110° C. to 160° C.

21. A process for producing an inorganic material as claimed in claim 19, wherein said heating is carried out in a first step at a temperature of 80° C. to 95° C. followed by a second step at a temperature of 110° C. to 200° C.

22. A process for producing an inorganic material as claimed in claim 18, wherein the coagulant is produced by contacting the palygorskite with a compound selected from the group consisting of $Mg(NO_3)_2$, $AlCl_3$, $CaCl_2$, $CaCO_3$, $CaSO_4$ and $BaCl_2$.

23. A process for producing an inorganic material as claimed in claim 18, wherein the coagulant has a water-soluble material coated thereon.

24. A process for producing an inorganic material as claimed in claim 23, wherein the coagulant has a plurality of different coatings thereon wherein each coating has a different degree of water-solubility.

25. A process for producing an inorganic material as claimed in claim 23, wherein the water-soluble coating is comprised of material selected from the group consisting of polyvinyl alcohol, starch, dextrin, $NaNO_3$, $Ca(OH)_2$, NaCl, $Ba(OH)_2$ and $Al(OH)_3$.

26. A process for producing an inorganic material comprising the steps of:
adding a coagulant composed of palygorskite to water glass; and
heating the water glass and coagulant to a temperature in the range of 80° C. to 600° C.;
thereby allowing polyvalent ions in the coagulant to gradually release from the coagulant and thus allowing the polyvalent ions and a solid content of the water glass to thoroughly react.

27. A process for producing an inorganic material as claimed in claim 26, wherein said heating is carried out at a temperature within the range of 110° C. to 160° C.

28. A process for producing an inorganic material as claimed in claim 26, wherein said heating is carried out in a first step at a temperature of 80° C. to 95° C. followed by a second step at a temperature of 110° C. to 200° C.

* * * * *